United States Patent

Matzner et al.

[15] 3,696,132
[45] Oct. 3, 1972

[54] MONOAMIDES OF MONOAMINO DIARYL SULFONES

[72] Inventors: Markus Matzner, Edison; Walter T. Reichle, Millington; Sui-Wu Chow; James E. McGrath, both of Somerville, all of N.J.

[73] Assignee: Union Carbide Corporation, New York, N.Y.

[22] Filed: April 6, 1970

[21] Appl. No.: 26,057

[52] U.S. Cl. ............................260/397.6, 260/78 L
[51] Int. Cl. ..............................................C07c 103/12
[58] Field of Search.........................260/397.6, 562 R

[56] References Cited

UNITED STATES PATENTS 2,260,626   10/1941   Kleiderer et al. ........260/397.6

OTHER PUBLICATIONS

Jacs Vol. 67: 1979, 1980, 1983 (1945), Heymann et al.

Primary Examiner—Henry R. Jiles
Assistant Examiner—S. D. Winters
Attorney—Paul A. Rose, Aldo J. Cozzi, Gerald R. O'Brien, Jr. and James J. O'Connell

[57] ABSTRACT

Compounds of the structure

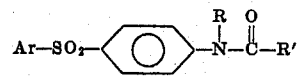

wherein Ar is a mono- or polynuclear aromatic radical, and
R and R' are $C_1$ to $C_{20}$ hydrocarbon radicals. These compounds are useful as initiators or activators in the anionic polymerization of lactam monomers.

4 Claims, No Drawings

MONOAMIDES OF MONOAMINO DIARYL SULFONES

BACKGROUND OF THE INVENTION

1. Field of the Invention

The invention relates to novel monoamide derivatives of N-substituted monoamino diaryl sulfones.

2. Description of the Prior Art

Certain diamino diphenyl sulfone derivatives, including certain diamides, have been prepared as disclosed in the Journal of the American Chemical Society, Volume 67, pages 1979 to 1990 (1945). The thus disclosed compounds were evaluated for biological activity.

Although the $SO_2$ group which links the phenyl radicals in this type of sulfone compound also tends to activate the entire compound for various types of chemical reactions, it has been found that the diamine compounds, as well as the bis-(acetamide) and bis (benzamide) derivatives of the diamine compounds are not active enough to be used as initiators in the anionic polymerization of lactam monomers.

Attempts to use acetanilide as an initiator for the anionic polymerization of $\epsilon$-caprolactam were also unsuccessful, Am. Chem. Soc., Div. Polym. Chem., Preprints 9 (1), at page 394. (1968).

SUMMARY OF THE INVENTION

Certain monoamide derivatives of N-substituted monoamino diaryl sulfone compounds are provided as novel compounds which are useful as initiators in the anionic polymerization of lactam monomers.

An object of the present invention is to provide for a novel class of derivatives of monoamino diaryl sulfone compounds.

A further object of the present invention is to provide compounds which may be useful as initiators or activators in the anionic polymerization of the lactam monomers.

DESCRIPTION OF THE PREFERRED EMBODIMENT

The novel compounds of the present invention have the structure

wherein Ar is a mono- or polynuclear aromatic radical,
and
R and R' are the same or different $C_1$ to $C_{20}$, inclusive, hydrocarbon radicals.

The Ar radical may be substituted with one or more inert substituent radicals. The inert substituent radicals are those which are capable of being substituted on an aromatic ring and which are inert to the components of the reaction systems in which the novel compounds of the present invention are formed, as well as to the basic components of the lactam polymerization systems in which they may be employed, i.e., the lactam monomer and the anionic polymerization catalyst.

Where the Ar radical contains a plurality of phenyl rings, the rings may be fused together, or bonded together through a single covalent bond or through an intervening polyvalent inorganic or organic radical.

The preferred Ar radical is a substituted or unsubstituted phenyl or naphthyl radical.

The R and R' radicals may be saturated or unsaturated. Such radicals would include aliphatic, alicyclic and aromatic radicals such as methyl, ethyl, propyl, butyl, cyloheptyl, cyclohexyl, allyl, propenyl, hexadienyl, octadienyl, phenyl, benzyl and naphthyl radicals.

The R and R' radicals may also be substituted with one or more inert substituent radicals. The inert substitutent radicals are those which are capable of being substituted on R and R' hydrocarbon radicals and which are inert to the components of the reaction systems in which the novel compounds of the present invention are formed, as well as to the basic components of the lactam polymerization systems in which they may be employed, i.e., the lactam monomer and the anionic polymerization catalyst.

The preferred R and R' radicals are methyl, ethyl, propyl, phenyl and naphthyl radicals.

PREPARATION OF THE NOVEL COMPOUNDS

The novel compounds of the present invention are prepared by reacting an amine compound having the structure

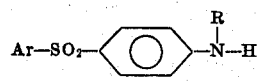

wherein Ar and R are as defined above, with at least one acyl compound having the structure

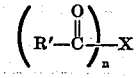

wherein R' is as defined above, n is a whole number of 1 or 2, and when n is 1, X is OH or a halogen radical, and when n is 2, X is an O radical, to form the desired amide compound, and, when n is 1 water or halogen acid is formed as a by-product, and when n is 2 the acid of the acyl compound is formed as a by-product.

The preferred acyl compounds for the purposes of the present invention are anhydrides or acyl halides, notable the acyl chlorides. It is preferable to use a molar excess of the acyl compound. When the acyl halides are used as the acyl compounds the reaction is preferably conducted in a halogen acid accepting solvent such as pyridine, alkyl substituted pyridines and triethylamine. At least one mole of the solvent is used per mole of halogen acid formed in the reaction. Excess solvent may be used for diluent purposes.

When water is a by-product, the reaction system preferably contains mechanical or chemical means for effectively removing the water so that the reaction may be driven to completion.

The reaction is conducted at atmospheric pressure and at temperatures of about 80° to 200° C. The preferred temperature is the reflux temperature of the mixture of the components of the reaction system. The reaction may be run under an inert blanket of a moisture free gas such as nitrogen. The reaction is usually conducted for a period of up to about 24 hours.

The novel amide compounds of the present invention are crystalline materials which may be readily recovered from the reaction systems in which they are prepared by precipatation with water or by extraction with solvents such as chloroform followed by crystallization from appropriate solvents such as chloroform, aqueous ethanol or aqueous acetone.

The following examples are merely illustrative of the present invention and are not intended as a limitation upon the scope thereof.

EXAMPLE 1

Preparation of p-phenyl sulfone-N-methyl acetanilide, i.e.,

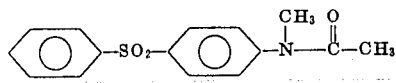

A mixture of 25 g. (0.1 mole) of phenyl p-chlorophenyl sulfone, 75 ml. of 40percent aqueous methylamine, and 0.25 g. of cuprous chloride was heated at 250° in a rocker bomb for 24 hours. The resulting aminated sulfone was isolated by washing with water until methylamine odor was only faintly detectable. To the crude aminated sulfone there was then added 100 ml. of acetic anhydride and the mixture was heated at reflux for 24 hours.

Excess acetic anhydride was then evaporated from the reaction system and the residue was poured into water. The amide was collected and recrystallized from 20percent aqueous ethanol. There was obtained 17.8 g. of the desired amide which had a melting point of 130° – 132°.

Calculated for: $C_{15}H_{15}NO_3S$
Calculated: C–62.25; H–5.22; N–4.84; S–11.08
Found: C–62.53; H–5.22; N–5.17; S–11.20

EXAMPLE 2

Polymerization of $\epsilon$-caprolactam using the amide compound prepared as in Example 1 as an anionic polymerization initiator.

Into each of two 25 × 200 mm test tubes was added 28.3 g. (0.25 mole) of molten caprolactam, and both were then heated at a polymerization temperature of 160° C. Two (2) mole percent of a catalyst, sodium hydride, in the form of a dispersion (57percent) in oil was added to one of these test tubes, while 0.5 mol percent of the initiator was added to the other. After solutions were formed and equilibrated with the bath temperature, they were mixed and then heated at the 160° C. polymerization temperature. The progress of the polymerization was followed visually. The time required for the development of opacity was taken as the time required for crystallization of the Nylon 6 formed.

The no flow time for the polymerization system was 1 to 1.5 minutes, and the time required for crystallization was 1.5–2 minutes.

What is claimed is:

1. A compound having the structure

wherein Ar is an unsubstituted phenyl or naphthyl radical and R and R' are selected from the group consisting of unsubstituted methyl, ethyl, propyl, butyl, cycloheptyl, cyclohexyl, allyl, propenyl, hexadienyl, octadienyl, phenyl, benzyl, and naphthyl radicals.

2. A compound as in claim 1 in which Ar is phenyl.

3. A compound as in claim 2 in which R and R' are the same.

4. A compound as in claim 3 which is p-phenyl sulfonyl-N-methyl acetanilide.

* * * * *